US011153932B2

(12) United States Patent
Gozalvez Serrano et al.

(10) Patent No.: US 11,153,932 B2
(45) Date of Patent: Oct. 19, 2021

(54) COMMUNICATION DEVICE, VEHICLE, METHOD AND COMPUTER PROGRAM FOR COMMUNICATION IN A MOBILE COMMUNICATION SYSTEM

(71) Applicant: Bayerische Motoren Werke Aktiengesellschaft, Munich (DE)

(72) Inventors: David Gozalvez Serrano, Munich (DE); Adrian Posselt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/041,474

(22) PCT Filed: Mar. 14, 2019

(86) PCT No.: PCT/DE2019/100232
§ 371 (c)(1),
(2) Date: Sep. 25, 2020

(87) PCT Pub. No.: WO2019/185083
PCT Pub. Date: Oct. 3, 2019

(65) Prior Publication Data
US 2021/0014935 A1    Jan. 14, 2021

(30) Foreign Application Priority Data
Mar. 27, 2018   (DE) ..................... 10 2018 204 639.5

(51) Int. Cl.
*H04W 88/06*  (2009.01)
*H04B 1/3822*  (2015.01)
(Continued)

(52) U.S. Cl.
CPC .......... *H04W 88/06* (2013.01); *H04B 1/3822* (2013.01); *H04B 7/0608* (2013.01); *H04B 7/0817* (2013.01)

(58) Field of Classification Search
CPC combination set(s) only.
See application file for complete search history.

(56) References Cited

U.S. PATENT DOCUMENTS

2011/0249576 A1* 10/2011 Chrisikos ............. H01Q 9/14
370/252
2012/0329407 A1* 12/2012 Rousu ............... H01Q 3/2605
455/90.2
(Continued)

FOREIGN PATENT DOCUMENTS

DE    10 2012 014 549 A1    1/2014
DE    10 2012 014 547 A1    5/2014
(Continued)

OTHER PUBLICATIONS

International Search Report (PCT/ISA/210) issued in PCT Application No. PCT/DE2019/100232 dated Jun. 26, 2019 with English translation (seven pages).

(Continued)

Primary Examiner — Junpeng Chen
(74) Attorney, Agent, or Firm — Crowell & Moring LLP

(57) ABSTRACT

A communication device for communication in one or more mobile communication systems has a selection device for coupling one or more mobile radio antennas to one or more signal paths on the basis of a selection signal. The communication device also has a transceiver module, which is designed to generate the selection signal and to communicate in the one or more mobile communication systems by way of the coupled mobile radio antennas. The transceiver module is designed to select, on the basis of two or more user identifications, different mobile radio antennas for communication in the one or more mobile communication systems by way of the selection signal. The transceiver module is designed to take isolation and/or correlation (Continued)

between the mobile radio antennas into account in the selection.

11 Claims, 3 Drawing Sheets

(51) Int. Cl.
    *H04B 7/06* (2006.01)
    *H04B 7/08* (2006.01)

(56) References Cited

U.S. PATENT DOCUMENTS

| | | | |
|---|---|---|---|
| 2015/0065073 A1* | 3/2015 | Yan | H04B 7/0817 455/133 |
| 2015/0173046 A1* | 6/2015 | Ehrentraut | H04W 12/06 370/329 |
| 2015/0181644 A1 | 6/2015 | Ehrentraut | |
| 2016/0316378 A1* | 10/2016 | Su | H04W 24/02 |
| 2017/0093457 A1 | 3/2017 | Jain et al. | |
| 2017/0094500 A1* | 3/2017 | Zhong | H04B 1/3816 |
| 2017/0171902 A1* | 6/2017 | Tillman | H04W 8/24 |
| 2017/0181071 A1 | 6/2017 | Lipka | |

FOREIGN PATENT DOCUMENTS

| | | |
|---|---|---|
| DE | 10 2016 215 781 A1 | 3/2017 |
| DE | 10 2015 122 543 A1 | 6/2017 |

OTHER PUBLICATIONS

German-language Wtillen Opinion (PC17ISA/237) issued in PCT Application No. PCT/DE2019/100232 dated Jun. 26, 2019 (nine pages).

German-language Search Report issued in German Application No. 10 2018 204 639.5 dated Nov. 27, 2018 with partial English translation (12 pages).

\* cited by examiner

COMMUNICATION DEVICE, VEHICLE, METHOD AND COMPUTER PROGRAM FOR COMMUNICATION IN A MOBILE COMMUNICATION SYSTEM

BACKGROUND AND SUMMARY OF THE INVENTION

Exemplary embodiments are concerned with a communication apparatus, a vehicle, a method and a computer program for communication in a mobile communication system, in particular but not exclusively with a design for the adaptive selection of mobile radio antennas on a vehicle for parallel communication in a mobile communication system.

Multiple generations of mobile communication systems are currently already used to provide digital data services. At present, the second, third and fourth mobile radio generations (2G, 3G, 4G) are being operated in parallel. In 2G and in 3G mobile radio networks, voice is transmitted in a circuit switched manner, while data are transmitted in a packet switched manner. 4G or Long Term Evolution (LTE) was originally designed as a pure packet switched data network. Voice calls are made by means of circuit switched fallback (CSFB) in a 2G or 3G mobile radio network. With the introduction of Voice over LTE (VoLTE), a packet switched voice service is now gradually becoming available in the 4G mobile radio networks, which may make CSFB superfluous. In a 2G mobile radio network, data and voice can be transmitted only sequentially; in 3G and 4G mobile radio networks, they can also be transmitted in parallel.

In the vehicle sector, permanently installed (i.e. soldered) user identification modules, subscriber identity module cards (SIM cards, also USIM "Universal SIM"), have become established. The data on a SIM card can also be interchanged via the air interface. Such methods and cards are known e.g. by the names "eSIM", "white-label SIM" or "SIM subscription management".

A SIM card may be permanently installed in a mobile radio module of a vehicle. In order to ensure a quality of service (e.g. for an emergency call functionality), a vehicle manufacturer signs a mobile radio contract with a network operator. This mobile radio contract for networked driving services cannot be used for vehicle user services (e.g. personal telephony), however. In a 2G mobile radio network, a voice call blocks the ability of the communication modem to interchange data in parallel, for example. Manufacturer-specific services of the networked vehicle would therefore be blocked. As such, calls are directed for example to the telephone number of the customer, i.e. to the mobile phone of the customer, and not to the vehicle. Data services in the vehicle are performed on the basis of the mobile radio contract of the vehicle manufacturer.

At present, vehicle mobile radio communication systems can therefore have one or more SIM cards or eSIM cards (embedded SIM). Multiple SIM cards are used for different communication purposes in a vehicle and are usually assigned to different applications. One SIM card may be assigned to the mobile radio contract of the driver, for example, and another may be assigned to the mobile radio contract of the OEM (original equipment manufacturer) for the services of the networked vehicle. The different SIM cards in a vehicle are usually operated in parallel by virtue of multiple mobile radio connections (each connection is assigned a SIM card) being maintained simultaneously.

For the parallel operation of multiple mobile radio connections, different antenna elements are normally used, which are positioned at different locations in the vehicle.

The parallel operation of multiple mobile radio connections in a vehicle can entail difficulties in comparison with the operation of a single connection (using just one SIM card). Specifically, interference between the mobile radio connections, or crosstalk between the individual signal paths, can occur on account of the short distance between antenna elements. This can be alleviated for example by virtue of the antenna elements being positioned at a sufficiently great distance from one another in order to achieve adequate isolation. There is therefore a need to provide an improved design for simultaneous communication in a mobile communication system.

Exemplary embodiments are based on the insight that the limited number of installation or fitting locations in a vehicle for integrating antenna elements and the continually increasing number of antenna elements in new mobile radio standards mean that adequate isolation between antenna elements cannot always be achieved. This isolation is dependent on the frequency bands of each mobile radio communication and can vary over the course of time depending on the mobile radio operator and the network characteristics. Furthermore, the number of antenna elements does not always need to correspond to the maximum number of antennas that are supported by the modem or by the modems for each SIM card installed in the vehicle. Exemplary embodiments therefore provide dynamic splitting and allocation of antenna elements/mobile radio antennas, for example over SIM cards installed in a vehicle, on the basis of the communication requirements of each SIM card and the requisite isolation between the different mobile radio connections. Consequently, antenna elements/mobile radio antennas can be assigned to a SIM card dynamically (i.e. in the course of a mobile radio communication) when they have increased communication requirements, for example on the basis of a data rate, a reliability or a latency, the assignment of these antenna elements being able to take into consideration the minimum isolation between the antenna elements/mobile radio antennas.

Exemplary embodiments provide a communication apparatus for communication in one or more mobile communication systems. The communication apparatus comprises a selection device for coupling one or more mobile radio antennas to one or more signal paths on the basis of a selection signal. The communication apparatus also comprises a transceiver module designed to generate the selection signal and to use the coupled mobile radio antennas to communicate in the one or more mobile communication systems. The transceiver module is designed to take two or more user identifications as a basis for selecting different mobile radio antennas for communication in the one or more mobile communication systems using the selection signal, wherein the transceiver module is designed to take into consideration an isolation and/or a correlation between the mobile radio antennas for the selection. The parallel communication can be organized efficiently by taking into consideration the respective antenna situation when the mobile radio antennas can be assigned dynamically.

In exemplary embodiments, the transceiver module can comprise two or more interfaces for two or more user identification modules. Exemplary embodiments can thus permit a parallel communication on the basis of different user identifications. The transceiver module may be designed to take the two or more user identifications as a basis for setting up two or more parallel connections in the one or more mobile communication systems. Such a communication can be made more efficient by the assignment of the mobile radio antennas. The transceiver module may also be designed to generate the selection signal on the basis of quality criteria for the two or more parallel connections. In this respect, exemplary embodiments can meet different quality demands on parallel connections by means of appropriate antenna assignment. In a few other exemplary embodiments, noise signals between the antennas for the frequency channels of the two mobile radio connections and quality demands of the current applications can also be taken into consideration for selecting the antennas. The transceiver module in a few exemplary embodiments may also be designed to take into consideration access technologies of the one or more mobile communication systems for the selection. By way of example, some exemplary embodiments can thus also take into consideration the susceptibility of different systems to interference.

In some exemplary embodiments, the transceiver module may be designed to select mobile radio antennas using the selection signal dynamically on the basis of demands on a data rate, a reliability or a latency. In this respect, different service categories and the quality demands thereof can be taken into consideration in exemplary embodiments. The transceiver module may furthermore be designed to additionally use mobile radio antennas permanently assigned to the user identifications to communicate in the one or more mobile communication systems. In this respect, additional mobile radio antennas can be dynamically assigned.

The transceiver module in some exemplary embodiments may be designed to take the selection signal as a basis for assigning all selectable mobile radio antennas to one of the user identifications. In this respect, a selection in favor of one user identification can be made in exemplary embodiments. In a few other exemplary embodiments, the selection device may be in the form of a switching matrix between the one or more mobile radio antennas and one or more inputs and/or outputs of the transceiver module. A switching matrix can allow uncomplicated coupling between the transceiver module and the mobile radio antennas.

Exemplary embodiments also provide a vehicle having a communication apparatus according to one of the preceding claims, having multiple mobile radio antennas and having multiple user identification modules. Exemplary embodiments can thus permit efficient and dynamic assignment of mobile radio antennas to a connection of a user identification in a vehicle.

Exemplary embodiments furthermore provide a method for communication in one or more mobile communication systems. The method comprises coupling one or more mobile radio antennas to one or more signal paths on the basis of a selection signal and generating the selection signal in order to use the coupled mobile radio antennas to communicate in the one or more mobile communication systems. The method also comprises selecting different mobile radio antennas on the basis of two or more user identifications for communication in the one or more mobile communication systems using the selection signal.

Another exemplary embodiment is a computer program for performing one of the methods described herein when the computer program is executed on a processor, a microcontroller or a programmable hardware component.

Exemplary embodiments are explained in more detail below with reference to the accompanying figures.

DETAILED DESCRIPTION OF THE DRAWINGS

Figure 1:
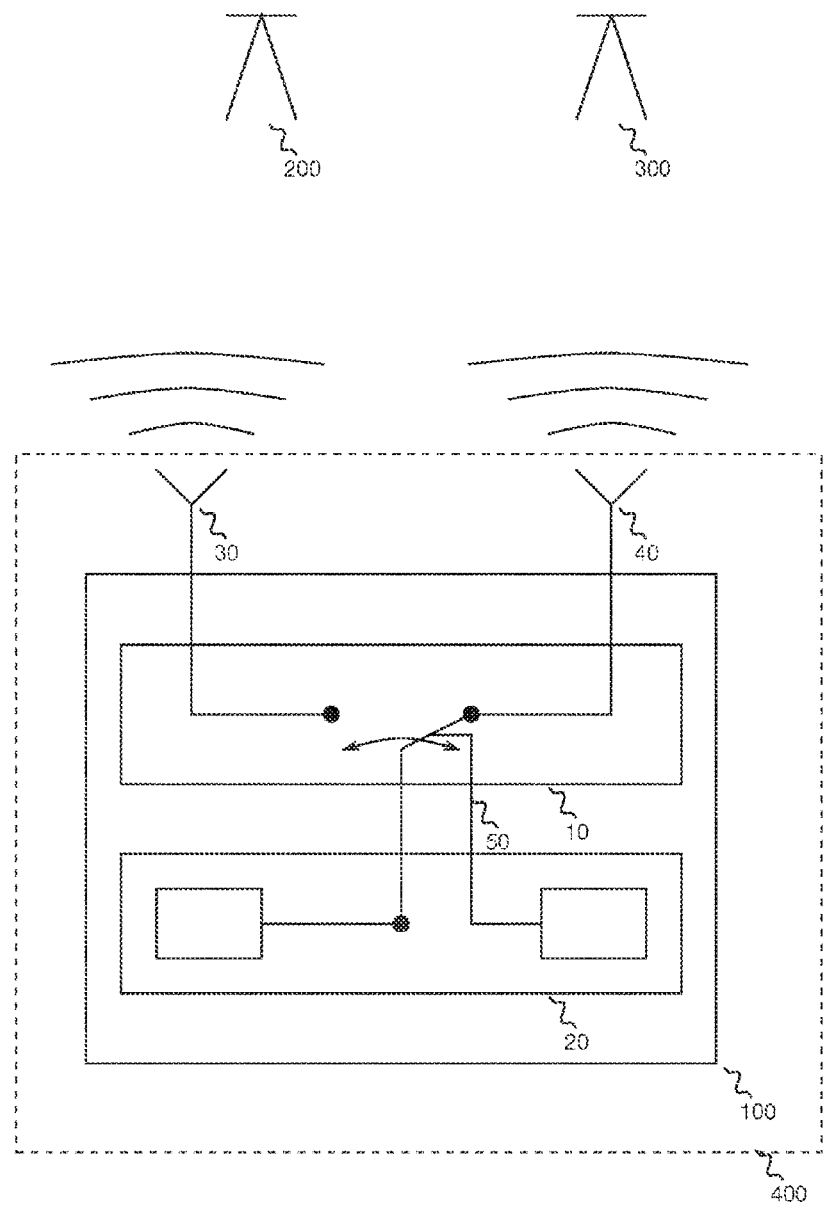
FIG. 1 is a block diagram of an exemplary embodiment of a communication apparatus and an exemplary embodiment of a vehicle.

Various exemplary embodiments are now described more thoroughly with reference to the accompanying drawings, which depict a few exemplary embodiments. In the figures, the thickness dimensions of lines, layers and/or regions may be depicted in an exaggerated manner for the sake of clarity.

In the description of the accompanying figures that follows, the figures merely showing a few illustrative exemplary embodiments, identical reference signs can denote identical or comparable components. Furthermore, collective reference signs can be used for components and objects that occur repeatedly in an exemplary embodiment or in a drawing but are described jointly with respect to one or more features. Components or objects that are described using identical or collective reference signs may be embodied identically, but possibly also differently, with respect to individual, multiple or all features, for example their dimensionings, unless the description explicitly or implicitly reveals something to the contrary.

Although exemplary embodiments can be modified and altered in various ways, exemplary embodiments are illustrated as examples in the figures and are described thoroughly herein. It should be clarified, however, that the intention is not for exemplary embodiments to be restricted to the forms respectively disclosed, rather that exemplary embodiments are intended to cover all functional and/or structural modifications, equivalents and alternatives that lie within the scope of the invention. Identical reference signs denote identical or similar elements throughout the description of the figures.

It should be noted that one element referred to as being "connected" or "coupled" to another element may be connected or coupled directly to the other element or that intervening elements may be present.

The terminology used herein serves only to describe specific exemplary embodiments and is not intended to restrict the exemplary embodiments. As used herein, the singular forms "a", "an", "one" and "the" are also intended to include the plural forms, as long as the context does not clearly indicate something to the contrary. Furthermore, it should be clarified that expressions such as e.g. "includes", "including", "has" and/or "having", as used herein, indicate the presence of stated features, integers, steps, work sequences, elements and/or components, but do not preclude the presence or addition of one or more features, integers, steps, work sequences, elements, components and/or groups thereof.

As long as there is no definition to the contrary, all terms (including technical and scientific terms) used herein have the same meaning ascribed to them by a person of average skill in the art in the field with which the exemplary embodiments are associated. Furthermore, it should be clarified that expressions, e.g. those defined in dictionaries generally used, should be interpreted as if they had the meaning consistent with their meaning in the context of the relevant art, as long as a definition to the contrary is not expressly given herein.

FIG. 1 shows a block diagram of an exemplary embodiment of a communication apparatus 100 and an exemplary embodiment of a vehicle 400. FIG. 1 illustrates a communication apparatus 100 for communication in one or more mobile communication systems 200, 300. The communication apparatus 100 comprises a selection device 10 for coupling one or more mobile radio antennas 30, 40 to one or more signal paths on the basis of a selection signal. The communication apparatus 100 also comprises a transceiver module 20, which is coupled to the selection device and which is designed to generate the selection signal 50. The transceiver module 20 is also designed to use the coupled mobile radio antennas 30, 40 to communicate in the one or more mobile communication systems 200, 300, wherein the transceiver module 20 is designed to take two or more user identifications as a basis for selecting different mobile radio antennas 30, 40 for communication in the one or more mobile communication systems 200, 300 using the selection signal 50, wherein the transceiver module 20 is designed to take into consideration an isolation and/or a correlation between the mobile radio antennas 30, 40 for the selection.

In another exemplary embodiment, it is also possible for three antenna elements to be used. In this case, a middle antenna element can be switched between two transceiver modules or user identifications. The two further antenna elements may be permanently connected to each user identification instead, as explained in more detail below. The switching can be effected on the basis of noise between the antenna elements and demands of the current applications, for example.

In some exemplary embodiments, such noise can also be measured, for example interference or crosstalk from one antenna element to another. A signal at a specific frequency can be routed to one antenna element and accordingly a noise signal on the other antenna elements can be measured for the frequency. Measurements of the frequency during operation (if necessary also by means of artificial iteration) and of the antenna elements allow a type of frequency-dependent/wavelength-dependent noise matrix to be determined that, depending on the frequency, contains a corresponding measure of the noise, interference or crosstalk for all antenna element combinations under consideration. Such a matrix can be stored as a table (also lookup table), so that the reciprocal noise conditions are available for specific antenna element combinations. The table can be created and updated on the basis of normal operation, for example. Such measurements would also be conceivable as part of a calibration process during production of the vehicle, during inspections, at regular intervals of time (e.g. once per day, week, month, year, etc.), before starting a journey, on starting the vehicle, etc.

On top of that, FIG. 1 optionally (dashed lines) shows a vehicle 400 having a communication apparatus 100, having multiple mobile radio antennas 30, 40 and if necessary having multiple user identification modules. In other words, the communication apparatus 100 in some exemplary embodiments may be integrated in a vehicle 400.

In exemplary embodiments, the one or more mobile radio systems or mobile communication systems, which are indicated by the two base stations 200, 300 in FIG. 1, can correspond to mobile radio systems, for example, which are standardized by applicable standardization committees, such as e.g. the 3rd Generation Partnership Project (3GPP) group. In other words, FIG. 1 illustrates that the at least two user identifications are taken as a basis for setting up two parallel connections. These connections can be set up to the same mobile communication system or else to different mobile communication systems. It would be conceivable to use the same or different access technologies (2G, 3G, 4G, 5G, etc.) in mobile communication systems of different operators and/or at different carrier frequencies, or else of the same operator at the same carrier frequency.

Examples of mobile communication systems of this kind include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as e.g. the Universal Mobile Telecommunications System (UMTS), Long Term Evolution (LTE) or LTE-Advanced (LTE-A), fifth generation systems (5G) or else mobile radio systems from other standards, such as e.g. the Worldwide Interoperability for Microwave Access (WIMAX), IEEE802.16 or Wireless Local Area Network (WLAN), IEEE802.11, and generally a system that is based on time division multiple access (TDMA), frequency division multiple access (FDMA), code division multiple access (CDMA), orthogonal frequency division multiple access (OFDMA) or another technology or multiple access method. The terms mobile radio system, mobile radio network and mobile communication system are used synonymously below.

It is assumed in the following text that a mobile radio system of this kind comprises at least one stationary transceiver in the sense of a base station 200, 300, which is connected to the wired part of the mobile radio network. On the other hand, it is assumed that the mobile radio network comprises at least one mobile transceiver 100 (mobile radio terminal), the term mobile in this instance being intended to refer to this transceiver being used to communicate via the air interface, i.e. wirelessly/cordlessly. A mobile transceiver of this kind can correspond to a portable telephone, a smartphone, a tablet computer, a portable computer or a radio module, for example, which is not necessarily mobile in the sense that it actually moves in relation to its surroundings. The transceiver may also be stationary (e.g. relative to a vehicle or motor vehicle) but can communicate with the mobile radio network wirelessly. In this respect, the aforementioned base station can correspond to a base station according to one of the aforementioned standards, for example a NodeB, an eNodeB, etc.

A base station transceiver or a base station (these terms can be used equivalently) may be designed to communicate with one or more active mobile radios and to communicate in or adjacently to a service area of another base station transceiver or of a base station, e.g. as a macrocell base station or as a small-cell base station. Hence, embodiments can comprise a mobile communication system having one or more mobile radio terminals and one or more base stations, the base station transceivers being able to provide macrocells or small cells, e.g. picocells, metrocells or femtocells. A mobile transceiver or mobile radio terminal can correspond to a smartphone, a mobile phone, a user device, a radio, a mobile, a mobile station, a laptop, a notebook, a personal computer (PC), a personal digital assistant (PDA), a universal serial bus (USB) stick or universal serial bus (USB) adapter, a vehicle, such as e.g. a motor vehicle, a car, a truck, motorcycles, bicycles, trains, aircraft, ships, all means of air, land and water transport, etc. A mobile transceiver can also be referred to as "user equipment (UE)" or mobile in line with 3GPP terminology.

A base station transceiver or a base station may, at least from the perspective of a mobile radio terminal, be situated in a fixed or at least permanently connected part of the network or system. A base station transceiver or a base station can also correspond to a remote radio head, a relay station, a transmission point, an access point, a radio, a macrocell, a small cell, a microcell, a femtocell, a metrocell, etc. A base station or a base station transceiver is therefore understood to be a logical concept of a node/unit for providing a radio carrier or radio connections via the air interface, which radio carrier or radio connections is/are used to provide a terminal/mobile transceiver with access to a mobile radio network.

A base station or a base station transceiver can be a wireless interface for mobile radio terminals to a wired network. The radio signals used may be radio signals standardized by 3GPP or radio signals in general in accordance with one or more of the aforementioned systems. As such, a base station or a base station transceiver can correspond to a NodeB, an eNodeB, a base transceiver station (BTS), an access point, a remote radio head, a transmission point, a relay station, etc. that can be divided into further functional units.

A mobile radio terminal or mobile transceiver can be assigned to a base station or cell or may be registered therewith. The term cell relates to a coverage area of the radio services that are provided by a base station, e.g. by a NodeB (NB), an eNodeB (eNB), a remote radio head, a transmission point, a relay station, etc. A base station can provide one or more cells on one or more carrier frequencies. In some embodiments, a cell can also correspond to a sector. For example, it is possible to form sectors with sector antennas that are designed to cover an angle section around an antenna site. In a few embodiments, a base station may be designed to operate three or six cells or sectors, for example (e.g. 120° in the case of three cells and 60° in the case of six cells). A base station can comprise multiple sector antennas. The terms cell and base station can also be used synonymously below.

In other words, in the embodiments, the mobile communication system can also comprise a heterogeneous cell network (HetNet) that has different cell types, e.g. cells with closed user groups (also "close subscriber group CSG") and open cells and also cells of different size, such as e.g. macrocells and small cells, the coverage area of a small cell being smaller than the coverage area of a macrocell. A small cell can correspond to a metrocell, a microcell, a picocell, a femtocell, etc. The coverage areas of the individual cells are provided by the base stations for their service areas and are dependent on the transmission powers of the base stations and the interference conditions in the respective area. In some embodiments, the coverage area of a small cell may be surrounded at least to some extent by a service area of another cell or can match or overlap the service area of e.g. a macrocell to some extent. Small cells can be used to extend the capacity of the network. A metrocell can therefore be used to cover a smaller surface area than a macrocell, e.g. metrocells are used to cover a road or a section in a built-up area. For a macrocell, the coverage area can have a diameter in the order of magnitude of one kilometer or more, e.g. even 10 km or more along freeways, for a microcell the coverage area can have a diameter of less than one kilometer, and a picocell can have a coverage area with a diameter of less than 100 m. A femtocell can have the smallest coverage area and it can be used to cover a domestic area, a motor vehicle area or a gate area at an airport, for example, i.e. its transmission area can have a diameter of below 50 m.

In exemplary embodiments, "communication" means that the communication apparatus sends or receives signals or data in the mobile communication system, or both. The selection device 10 can be in the form of a switching or switch matrix. By way of example, transistor switches can be used to couple or connect the mobile radio antennas to the respective outputs or inputs of the transceiver module 20. In this instance, for example radiofrequency switches (RF switches), RF components or cascade, parallel or series connections of such switches can be used. In other words, the selection device 10 in exemplary embodiments can be realized as any multiplexing or demultiplexing circuit component. A mobile radio antenna can be realized as an antenna element, for example it can also be realized as part of an antenna array. In general, a mobile radio antenna in exemplary embodiments is not limited to one specific antenna type, but rather may be a dipole antenna, a directional antenna, a Yagi antenna, a horn antenna, a patch antenna, etc.

In exemplary embodiments, the transceiver module 20 can correspond to any module having receiving and/or transmitting means, a transmitter, a receiver, a transceiver, etc. The transceiver module 20 can contain typical transmitter and receiver components. These can include for example one or more antenna connections, one or more filters, one or more mixers, one or more amplifiers, one or more diplexers, one or more duplexers, etc. As FIG. 1 shows, the selection signal 50 can be used by the transceiver module 20 to select a mobile radio antenna 30, 40 using the selection device 10. The blocks indicated in the transceiver module 20 can correspond to input or output stages, control modules, etc. In exemplary embodiments, such a control module in the transceiver module 20 can correspond to any controller or processor or to a programmable hardware component. By way of example, the control module can also be realized as software or a computer program that is programmed for an appropriate hardware component. In this respect, the control module can be implemented as programmable hardware with appropriately adapted software. Any processors such as digital signal processors (DSPs) can be used in this case. Exemplary embodiments are not limited to one specific type of processor. Any processors or else multiple processors are conceivable for implementing the control module.

In exemplary embodiments, the user identifications can comprise identifications for different mobile communication systems, for example, or an identification of a user (e.g. driver of a vehicle for mobile radio services) and that of a vehicle (for using telemetry or other services). In a few other exemplary embodiments, dynamic splitting and allocation of antenna elements over the SIM cards installed in the vehicle can take place on the basis of the communication requirements of each SIM card and the requisite isolation between the different mobile radio connections. The transceiver module 20, at least in some exemplary amendments, can therefore comprise two or more interfaces for two or more user identification modules, e.g. SIMs or USIMs. The two or more user identifications can be taken as a basis for setting up two or more parallel connections in the one or more mobile communication systems 200, 300.

Consequently, antenna elements/mobile radio antennas 30, 40 can be assigned to a SIM card dynamically (i.e. in the course of a mobile radio communication) when the SIM card has increased communication requirements, such as for example in the form of data rate, reliability or latency, and the assignment of these antenna elements/mobile radio antennas 30, 40 does not infringe the minimum isolation between all antenna elements according to a current frequency band configuration of the mobile radio connections. The isolation between individual antennas can be frequency-dependent/wavelength-dependent and installation-dependent (e.g. position on the vehicle, relative position/orientation of the antennas among one another, etc.). In other words, interference or else crosstalk can arise between the individual antennas that is dependent on the respective frequency and that can be taken into consideration for selecting the antennas.

The transceiver module 20 may be designed to generate the selection signal 50 on the basis of quality criteria for the two or more parallel connections. The transceiver module 20 may be designed to select mobile radio antennas 30, 40 using the selection signal 50 dynamically on the basis of demands on a data rate, a reliability or a latency. Furthermore, the transceiver module 20 in some exemplary embodiments is designed to take into consideration an isolation between the mobile radio antennas 30, 40 for the selection.

The isolation (also interference or crosstalk) may also be dynamic in this case and can change over the course of time, for example on account of different frequency configurations or else access technologies in the one or more mobile radio connections. Specific frequency combinations may be more problematic when viewed from an interference perspective. Several factors can have an influence in this case. For example, a spacing between frequency channels, a lack of synchronization between the frequency channels, a multiplexing method in frequency channels (e.g. LTE FDD/LTE TDD), can influence the reciprocal noise and hence the selection in exemplary embodiments. This fact, together with the installation position of the antennas on the bodywork of the vehicle, can jointly determine the suitability of the antennas for the mobile radio communication in exemplary embodiments. As such, the transceiver module 20 may be designed to take into consideration access technologies of the one or more mobile communication systems 200, 300 for the selection, or else combinations of the individual factors such as installation position on the bodywork of the vehicle, quality demands (QoS) of the respective services, the frequency channels of the mobile communication systems 200, 300, the respective access technologies, synchronization, etc.

The requisite isolation may, depending on the frequency combination, be dependent on the properties of the communication module installed in the vehicle and can be determined in advance, so that it can be stored in the form of a table, for example.

Exemplary embodiments can thus provide for the dynamic selection of multiple antennas for MIMO applications. By way of example, the indicator or selection criterion used for the respective antennas can be an antenna correlation and/or an antenna isolation. As such, advantageous (theoretically even optimum) selection/assignment of antennas to two NADs, which are both MIMO-compatible, can be effected. In exemplary embodiments, it is accordingly possible to use an examination of the isolation and/or antenna correlation, which, in comparison with quality indicators measured/determined using the mobile radio network, can afford advantages on the basis of the specific physical layer parameters (physical protocol layer, radio parameters) taken into consideration.

Exemplary embodiments can thus take into consideration automotive, specific installation positions of the antennas for example in the form of a correlation matrix and/or isolation matrix. Such a matrix can reproduce for example the reciprocal isolation, damping, signal correlation, a crosstalk, a coupling of all antenna pairs under consideration. These values are determined initially, e.g. during vehicle design, and transferred to the antenna selection algorithm/method on a frequency-dependent basis for all mobile radio frequencies (e.g. using a lookup table) as part of the vehicle/derivative-specific encoding. These values can be taken into consideration as part of an additional weighting within the mobile-radio-standard-specific antenna selection algorithm. As such, preference can be given to particularly favourably and well-positioned antenna combinations.

Exemplary embodiments in the automotive context can make use of the size of the whole vehicle in relation to the wavelength of the antennas that are typically used. As such, clever use can be made of a particular suitability of individual antennas or antenna combinations for specific frequency ranges and channel scenarios (urban channel, rural channel, etc.). The acknowledgement can be provided by the aforementioned additional weighting by taking into consideration the position of each antenna on the vehicle, the interaction of antenna combinations on the vehicle and by taking into consideration the respective fundamental frequency.

The aforementioned additional weighting additionally results in a default assignment (basic assignment), i.e. a best assignment of antennas or antenna combinations to the individual NADs. In typical automotive use scenarios (driving on the freeway), the channel scenarios change accordingly quickly. At least some exemplary embodiments accordingly use continuous adaptation of the antenna selection on the basis of measurements of the channel matrix. Furthermore, parameters to describe the MIMO capability of the overall system comprising the antenna system (including all combinations) and the mobile radio channel, such as condition number or ellipticity, can be derived.

Another exemplary embodiment can be explained using the following example. A vehicle having a total of six antenna elements will have two SIM cards installed in it, SIM 1 and SIM 2.

Figure 2:
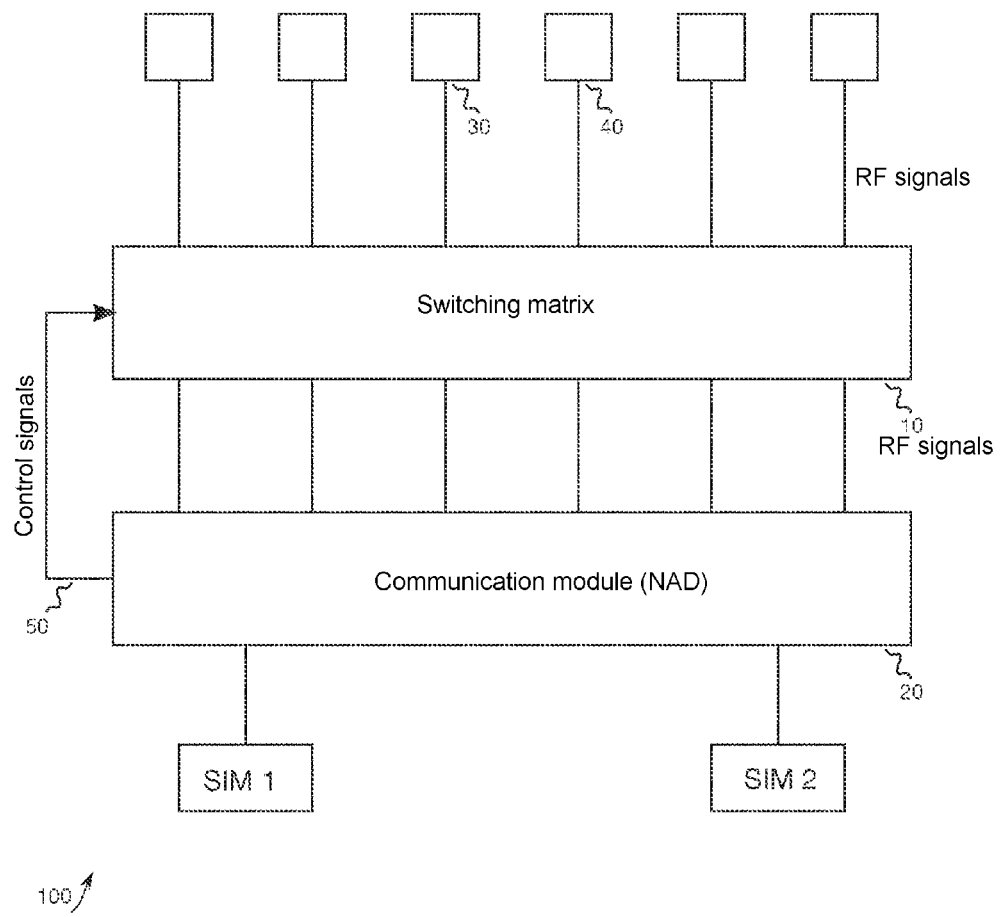
FIG. 2 is another exemplary embodiment of a communication apparatus for a vehicle.

FIG. 2 shows one such exemplary embodiment of a communication apparatus 100 for a vehicle. The transceiver module 20 comprises two interfaces to the user identification modules for SIM 1 and SIM 2. These are provided for the mobile radio contract of the OEM and that of the driver. The selection device 10 in this case is implemented as a switching matrix, which is coupled to the different mobile radio antennas 30, 40. The selection device 10 may accordingly be in the form of a switching matrix between the one or more mobile radio antennas 30, 40 and one or more inputs and/or outputs of the transceiver module 20, which switching matrix switches in the radiofrequency range (RF), for example. A plurality of mobile radio antennas are possible in principle, just two being indicated as an example in FIG. 2 to represent the plurality. The transceiver module 20 is coupled to the switching matrix 10 and generates control signals as selection signal 50 for the switching matrix 10 for the purpose of selecting appropriate mobile radio antennas 30, 40. The transceiver module in this exemplary embodiment is implemented as a communication module (also network access device (NAD)).

Furthermore, it is assumed in the present exemplary embodiment that two antenna elements that are at a relatively short distance from one another are permanently assigned to the first SIM card (SIM 1). Two other antenna elements, which likewise are positioned at a relatively short distance from one another in the vehicle, but are arranged at a relatively great distance from the first two antenna elements, are permanently assigned to the second SIM card (SIM 2) instead. In this exemplary embodiment, the transceiver module 20 is accordingly designed to additionally use mobile radio antennas permanently assigned to the user identifications to communicate in the one or more mobile communication systems 200, 300.

In the exemplary embodiment under consideration, there are also two further antenna elements 30, 40 present in the vehicle, which can be assigned to each of the two SIM cards (SIM 1, SIM 2) dynamically. These two antenna elements 30, 40 are assigned to the first SIM card (SIM 1) if the latter has increased communication requirements on the basis of the current applications and only on condition that the isolation between these antenna elements 30, 40 and antenna elements permanently assigned to the second SIM card (SIM 2) is adequate. On the other hand, the same two antenna elements are assigned to the second SIM card (SIM 2) if the latter has increased communication requirements on the basis of the current applications and only on condition that the isolation between these antenna elements and antenna elements permanently assigned to the first SIM card (SIM 1) is adequate.

In some exemplary embodiments, the transceiver module 20 is accordingly designed to take the selection signal 50 as a basis for assigning all selectable mobile radio antennas 30, 40 to one of the user identifications, e.g. SIM 1, SIM 2. The respective frequency- and installation-space-dependent isolation between the subsystems is taken into consideration for this assignment in the present case. The previous method can be performed using the system shown in FIG. 2, for example. The system has a communication module 20 or NAD (network access device), a switching matrix 10 and the antenna inputs and outputs of the respective antenna elements 30, 40. The antenna inputs and outputs in the NAD can be assigned to different antenna elements 30, 40 by means of the switching matrix 10 on the basis of control signals 50 from the NAD 20. Normally, antenna inputs and outputs in the NAD 20 are permanently assigned to the SIM cards.

The proposed exemplary embodiment of a system allows the NAD 20 to assign the best selection of antenna elements 30, 40 to each SIM card in exemplary embodiments, on the basis of the current frequency combination of the different mobile radio connections, the stored requisite isolation between antenna elements for each frequency combination and the current communication requirements of the SIM cards.

Exemplary embodiments can improve, in some cases even optimize, the use of multiple SIM cards in a vehicle with a reduced number of antenna elements. This can lead not only to a saving in terms of cost and weight but also to an improved customer experience for applications in the field of vehicle connectivity.

Figure 3:
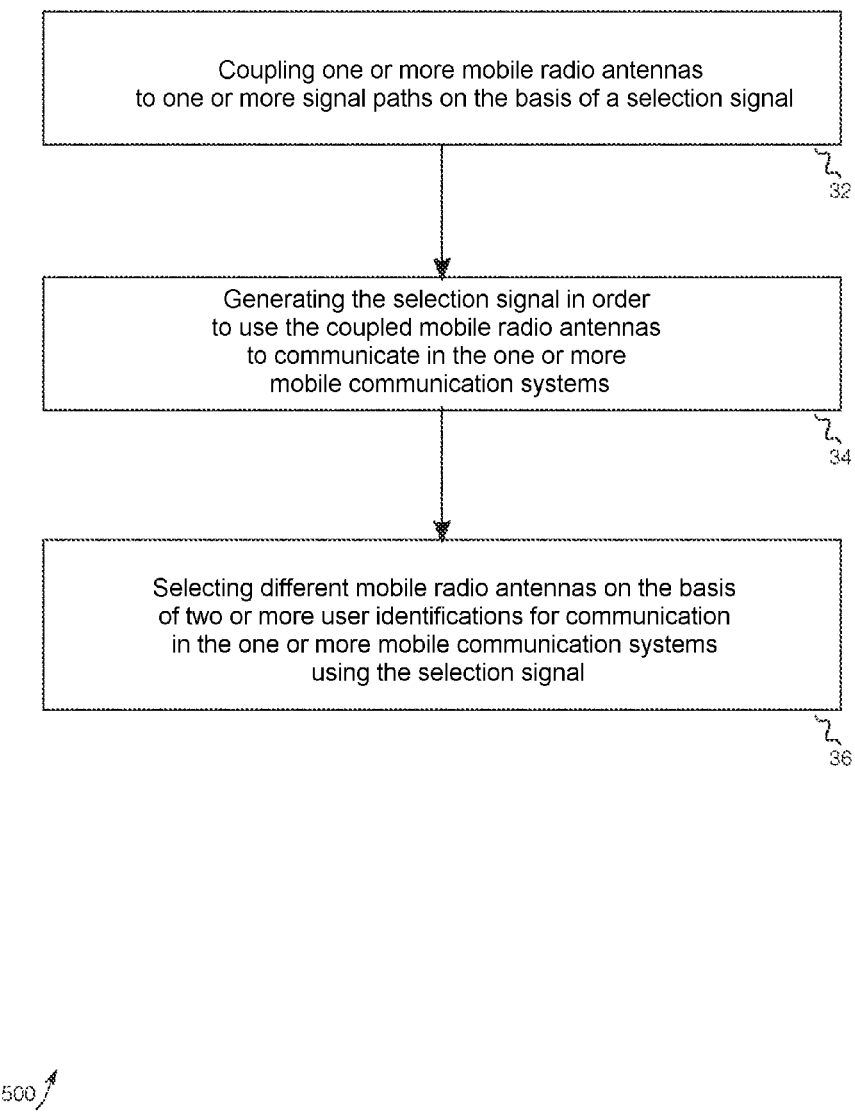
FIG. 3 is a block flow diagram of an exemplary embodiment of a method for communication.

FIG. 3 shows a block diagram of an exemplary embodiment of a method 500 for communication. The method 500 for communication in one or more mobile communication systems 200, 300 comprises coupling 32 one or more mobile radio antennas 30, 40 to one or more signal paths on the basis of a selection signal 50. The method 500 also comprises generating 34 the selection signal 50 in order to use the coupled mobile radio antennas 30, 40 to communicate in the one or more mobile communication systems 200, 300. The method 500 furthermore comprises selecting 36 different mobile radio antennas 30, 40 on the basis of two or more user identifications for communication in the one or more mobile communication systems 200, 300 using the selection signal 50.

In other exemplary embodiments, the selecting 36 of the antennas can comprise multiple steps, for example detecting the frequency channels on the two SIM cards, assessing interference by means of measurements or by means of "lookup tables" on the basis of the frequency channels and installation positions/fitting locations of the antennas in the vehicle, or evaluating the quality demands of the current applications. The selection can take place as a one-off at the beginning of the communication, regularly or after specific conditions are triggered (for example a rise above an interference threshold or a drop below a quality parameter).

Another exemplary embodiment is a computer program for performing one of the methods described herein when the computer program is executed on a processor, a microcontroller or a programmable hardware component.

The features disclosed in the description above, the claims below and the accompanying figures may be significant, and can be implemented, in their various embodiments either individually or in any combination for the implementation of an exemplary embodiment.

Although some aspects have been described in connection with an apparatus, it goes without saying that these aspects are also a description of the corresponding method, which means that a block or an element of an apparatus is also intended to be understood to mean a corresponding method step or to mean a feature of a method step. Similarly, aspects that have been described in connection with or as a method step are also a description of a corresponding block or detail or feature of a corresponding apparatus.

Depending on the particular implementation requirements, it is possible for exemplary embodiments of the invention to be implemented in hardware or in software. The implementation can be performed using a digital storage medium, for example a floppy disk, a DVD, a Blu-Ray disk, a CD, a ROM, a PROM, an EPROM, an EEPROM or a FLASH memory, a hard disk or another magnetic or optical memory that stores electronically readable control signals that are able to interact, or do interact, with a programmable hardware component such that the respective method is carried out.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a system on a chip (SOC), a programmable logic element or a field-programmable gate array (FPGA) with a microprocessor.

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is carried out. An exemplary embodiment is therefore a data storage medium (or a digital storage medium or a computer-readable medium) on which the program for carrying out one of the methods described herein is recorded.

In general, exemplary embodiments of the present invention may be implemented as a program, firmware, computer program or computer program product with a program code or as data, the program code or the data being operative for carrying out one of the methods when the program is executed on a processor or a programmable hardware component. By way of example, the program code or the data may also be stored on a machine-readable storage medium or data storage medium. The program code or the data may be present as source code, machine code or bytecode and also as other intermediate code, inter alia.

Furthermore, another exemplary embodiment is a data stream, a signal train or a sequence of signals that is or are the program for carrying out one of the methods described herein. By way of example, the data stream, the signal train or the sequence of signals may be configured to be transferred via a data communication connection, for example via the Internet or another network. Exemplary embodiments are thus also signal trains that represent data and that are suitable for transmission via a network or a data communication connection, the data being the program.

A program according to an exemplary embodiment can implement one of the methods while it is carried out, for example by reading memory locations or writing a datum or multiple data thereto, which brings about switching processes or other processes in transistor structures, in amplifier structures, or in other electrical, optical or magnetic assemblies or assemblies operating on the basis of a different operating principle, if need be. Accordingly, by reading a memory location, it is possible to capture, determine or measure data, values, sensor values or other information from a program. A program can therefore capture, determine or measure magnitudes, values, measured variables and other information by reading one or more memory locations, and can cause, prompt or perform an action and also actuate other appliances, machines and components by writing to one or more memory locations.

The exemplary embodiments described above are merely an illustration of the principles of the present invention. It goes without saying that modifications and variations of the arrangements and details described herein will be apparent to other persons skilled in the art. It is therefore intended that the invention be limited only by the scope of protection of the patent claims below and not by the specific details that have been presented herein using the description and the explanation of the exemplary embodiments.

What is claimed is:

1. A communication apparatus for communication in one or more mobile communication systems, the communication apparatus comprising:
    a first mobile radio antenna that is permanently assigned to a first user identification to communicate in the one or more mobile communication systems;
    a second mobile radio antenna that is permanently assigned to a second user identification to communicate in the one or more mobile communication systems;
    a selection device for coupling one or more third mobile radio antennas to one or more signal paths on the basis of a selection signal; and
    a transceiver module designed to generate the selection signal and to use the coupled third mobile radio antennas to communicate in the one or more mobile communication systems, wherein
    the transceiver module is designed to select different ones of the third mobile radio antennas on the basis of the first user identification and the second user identification take two or more user identifications as a basis for selecting different mobile radio antennas for communication in the one or more mobile communication systems using the selection signal while taking into consideration an isolation and/or a correlation between the mobile radio antennas, wherein the two or more user identifications first user identification and the second user identification correspond to two or more different users, and
    the transceiver module is designed to take into consideration an isolation and/or a correlation between the mobile radio antennas for the selection.

2. The communication apparatus according to claim 1, wherein
    the transceiver module comprises two or more interfaces for two or more user identification modules.

3. The communication apparatus according to claim 1, wherein
    the transceiver module is designed to take the two or more user identifications as a basis for setting up two or more parallel connections in the one or more mobile communication systems.

4. The communication apparatus according to claim 3, wherein
    the transceiver module is designed to generate the selection signal on the basis of quality criteria for the two or more parallel connections.

5. The communication apparatus according to claim 3, wherein
    the transceiver module is designed to select the third mobile radio antennas using the selection signal dynamically on the basis of demands on a data rate, a reliability or a latency.

6. The communication apparatus according to claim 1, wherein
    the transceiver module is designed to take into consideration access technologies of the one or more mobile communication systems for the selection.

7. The communication apparatus according to claim 1, wherein
    the transceiver module is designed to take the selection signal as a basis for assigning all selectable of the third mobile radio antennas to one of the user identifications.

8. The communication apparatus according to claim 1, wherein
    the selection device is in the form of a switching matrix between the one or more third mobile radio antennas and one or more inputs and/or outputs of the transceiver module.

9. A vehicle comprising:
    a communication apparatus according to claim 1;
    multiple mobile radio antennas; and
    multiple user identification modules.

10. A method for communication in one or more mobile communication systems, the method comprising:
    permanently assigning a first mobile radio antenna to a first user identification to communicate in the one or more mobile communication systems;
    permanently assigning a second mobile radio antenna to a second user identification to communicate in the one or more mobile communication systems;
    coupling one or more third mobile radio antennas to one or more signal paths on the basis of a selection signal;
    generating the selection signal in order to use the coupled third mobile radio antennas to communicate in the one or more mobile communication systems; and
    selecting different ones of the third mobile radio antennas on the basis of two or more user identifications the first user identification and the second user identification for communication in the one or more mobile communication systems using the selection signal while taking into consideration an isolation and/or a correlation between the mobile radio antennas, wherein the two or more user identifications first user identification and the second user identification correspond to two or more different users.

11. A computer product comprising a non-transitory computer readable medium having stored thereon program code which, when executed on a processor, a microcontroller or a programmable hardware component, carries out the acts of:

permanently assigning a first mobile radio antenna to a first user identification to communicate in the one or more mobile communication systems;
permanently assigning a second mobile radio antenna to a second user identification to communicate in the one or more mobile communication systems;
coupling one or more third mobile radio antennas to one or more signal paths on the basis of a selection signal;
generating the selection signal in order to use the coupled third mobile radio antennas to communicate in the one or more mobile communication systems; and
selecting different ones of the third mobile radio antennas on the basis of two or more user identifications the first user identification and the second user identification for communication in the one or more mobile communication systems using the selection signal while taking into consideration an isolation and/or a correlation between the mobile radio antennas, wherein the two or more user identifications first user identification and the second user identification correspond to two or more different users.

\* \* \* \* \*